United States Patent
Sakajiri

(10) Patent No.: US 6,704,419 B1
(45) Date of Patent: Mar. 9, 2004

(54) INFORMATION PROVIDING SYSTEM

(75) Inventor: Noriyasu Sakajiri, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/316,941

(22) Filed: May 21, 1999

(30) Foreign Application Priority Data

May 27, 1998 (JP) ............................... 10-145314

(51) Int. Cl.$^7$ ................................. H04L 9/00
(52) U.S. Cl. .................... 380/231; 380/278; 705/52
(58) Field of Search ................. 380/231, 277, 380/278, 279, 281; 705/52, 55, 59; 455/3.01, 3.03

(56) References Cited

U.S. PATENT DOCUMENTS

| | | | | |
|---|---|---|---|---|
| 6,055,314 A | * | 4/2000 | Spies et al. ............... | 380/228 |
| 6,069,952 A | * | 5/2000 | Saito et al. ............... | 705/57 |
| 6,141,754 A | * | 10/2000 | Choy ....................... | 713/200 |
| 6,240,514 B1 | * | 5/2001 | Inoue et al. .............. | 713/153 |
| 6,408,390 B1 | * | 6/2002 | Saito ....................... | 713/193 |
| 6,438,694 B2 | * | 8/2002 | Saito ....................... | 713/189 |
| 6,463,155 B1 | * | 10/2002 | Akiyama et al. .......... | 380/278 |

FOREIGN PATENT DOCUMENTS

| | | |
|---|---|---|
| EP | 0696121 | 2/1996 |
| JP | 10-42333 | 2/1988 |
| JP | 9-269794 | 10/1997 |
| JP | 11266483 A | * 9/1999 ............ H04Q/7/38 |

OTHER PUBLICATIONS

Fryer et al, "Microsoft Press Computer Dictionary" 1997, Microsoft Press, 3rd Edition, p. 107,483.*

* cited by examiner

*Primary Examiner*—Ayaz Sheikh
*Assistant Examiner*—Christopher Revak
(74) *Attorney, Agent, or Firm*—Dickstein, Shapiro, Morin & Oshinsky, LLP.

(57) ABSTRACT

An information providing terminal 3 notifies a mobile information terminal 1 of an item and a ciphered information body when a circuit between the mobile information terminal 1 and the information providing terminal 3 is not busy. The mobile information terminal 1 displays only the items to a user and, when the user selects one of them which is necessary, requests the information providing terminal 3 to send a deciphering key for the selected information. The information providing terminal 3 charges for the information notified to the mobile information terminal 1 by utilizing the request of the deciphering key from the mobile information terminal 1. Thus, it is provided an information providing system capable of charging on the basis of an amount of pure data of the notified information, with reduction of a waiting time up to a time at which the user reads the information and a load of a network.

12 Claims, 9 Drawing Sheets

INFORMATION PROVIDING SYSTEM

CROSS REFERENCE TO RELATED APPLICATIONS

The present invention claims priority from Japanese Patent Application No. 10-145314 filed May 27, 1998, the contents of which are incorporated herein by reference.

BACKGROUND OF THE INVENTION

1. Field of the Invention

The present invention relates to an information providing system and a charging method therefor and a recording medium recorded with a control program therefor and, particularly, to a charging method in an information providing system for providing an information from an information providing terminal to a mobile information terminal.

2. Description of Related Art

In a conventional information providing system of the above mentioned type, a mobile information terminal and an information providing terminal are connected through a network and a pay information sent from the information providing terminal through a cable circuit to the network is sent to the mobile information terminal through a radio circuit. In such system, a user (owner) of the mobile information terminal is charged correspondingly to an amount of pay information every time the pay information is sent from the information providing terminal to the mobile information terminal. The pay information may include an electronic mail, news, an information of new music and/or concert and a stock information, etc.

In the conventional information providing system mentioned above, in which the mobile information terminal is connected to the network through the radio circuit, when the user (owner) of the mobile information terminal enters into a building or a tunnel, there is a possibility of dropping of a communication between the information providing terminal and the mobile information terminal. When such communication drop occurs between the information providing terminal and the mobile information terminal before the mobile information terminal receives a complete information, not only does data received before the communication drop become meaningless, but also the user (owner) of the mobile information terminal can not see the data itself as well.

Further, when a re-transmission of data from the information providing terminal to the mobile information terminal occurs due to any communication drop therebetween, the user (owner) of the mobile information terminal is charged too much compared with an amount of data actually received by the mobile information terminal since the charging is performed according to the amount of data transmitted by the information providing terminal.

Further, in a case where an information such as news is to be obtained on the side of the mobile information terminal, it receives the information from the information providing terminal regardless of whether or not the news are necessary on the side of the mobile information terminal, causing a circuit to be confused.

SUMMARY OF THE INVENTION

An object of the present invention is to provide an information providing system and a charging method therefor, which can reduce a waiting time up to a time at which a user can read an information as well as a load of a network and can charge according to an amount of pure data transmitted from the information providing terminal to a mobile information terminal, as well as a recording medium recorded with a control program therefor.

An information providing system according to the present invention, in which a mobile information terminal having a function of displaying an information on a screen by utilizing a radio wave and an information providing terminal are connected to each other through a network, comprises ciphering means provided in the information providing terminal, for ciphering a notice information body to be provided to the mobile information terminal, notice means provided in the information providing terminal, for notifying the mobile information terminal of an item of the notice information and the notice information body ciphered by the ciphering means, request means provided in the mobile information terminal, for requesting the information providing terminal to send a deciphering key of the notice information corresponding to the item selected when only the item of the notice information transmitted from the notice means is displayed, deciphering means provided in the mobile information terminal, for deciphering the corresponding notice information body on the basis of the deciphering key transmitted from the information providing terminal and charging means provided in the information providing terminal, for charging for the notice information notified to the mobile information terminal according to the request of the deciphering key from the mobile information terminal.

A charging method of the information providing system in which a mobile information terminal having a function of displaying an information on a screen by utilizing a radio wave and an information providing terminal are connected to each other through a network, comprises the steps of ciphering a notice information body to be provided to the mobile information terminal, notifying the mobile information terminal of an item of the notice information and the notice information body ciphered by the ciphering means, requesting the information providing terminal to transmit a deciphering key of the notice information corresponding to the item selected when only the item of the notice information transmitted from the notice means is displayed, deciphering the corresponding notice information body on the basis of the deciphering key transmitted from the information providing terminal and charging for the notice information notified to the mobile information terminal according to the request of the deciphering key from the mobile information terminal.

The recording medium recorded with a charging control program of the information providing system of the present invention, in which a mobile information terminal having a function of displaying an information on a screen by utilizing a radio wave and an information providing terminal are connected to each other through a network, is a recording medium recorded with a charging control program for causing the information providing terminal to charge for an information provided to the mobile information terminal. The program performs the charging by ciphering a body of a notice information to be provided to the mobile information terminal, notifying the mobile information terminal of an item of the notice information and the ciphered notice information body, requesting the information providing terminal to transmit a deciphering key of the notice information corresponding to the item selected when only the item of the notice information transmitted from the information providing terminal is displayed, deciphering the corresponding notice information body on the basis of the deciphering key transmitted from the information providing terminal and, then, charging the notice information notified to the mobile information terminal according to the request of the deciphering key from the mobile information terminal.

That is, the information providing system of the present invention, in which there is the network between the mobile information terminal having the function of displaying an information on the screen by utilizing a radio wave and then information providing terminal, the item of the information and the ciphered information body is notified from the information providing terminal to the mobile information terminal when the circuit between the mobile information terminal and the information providing terminal is not busy.

The mobile information terminal displays only the item of the information to a user and, when the user selects a necessary information, requests the information providing terminal to transmit the deciphering key for the selected information.

Since the mobile information terminal has received the information body already when the deciphering key is requested, the information providing terminal charges for the notified information to the mobile information terminal by utilizing the request of deciphering key from the mobile information terminal.

Since the mobile information terminal has received the information body preliminarily ciphered in the information providing terminal, it is possible to reduce the waiting time from the time at which the user selects the necessary information to a time at which the user reads the information.

Further, since the information providing terminal ciphers the information body and transmits the information to the mobile information terminal during a time period in which the circuit connecting the information providing terminal to the mobile information terminal is not busy, it is possible to reduce a load of the network.

Further, since the charging for the information transmitted to the mobile information terminal is performed upon an acquirement of the deciphering key, the charging for a communication in the re-transmission of the ciphered information body is not performed and it is possible to charge the mobile information terminal according to the amount of pure data.of the information transmitted from the information providing terminal to the mobile information terminal.

BRIEF DESCRIPTION OF THE DRAWINGS

The above mentioned and other objects, features and advantages of the present invention will become more apparent by reference to the following description of the invention taken in conjunction with the accompanying drawings, in which.

DETAILED DESCRIPTION OF THE PREFERRED EMBODIMENTS

Now, an embodiment of the present invention will be described with reference to the drawings.

Figure 1:
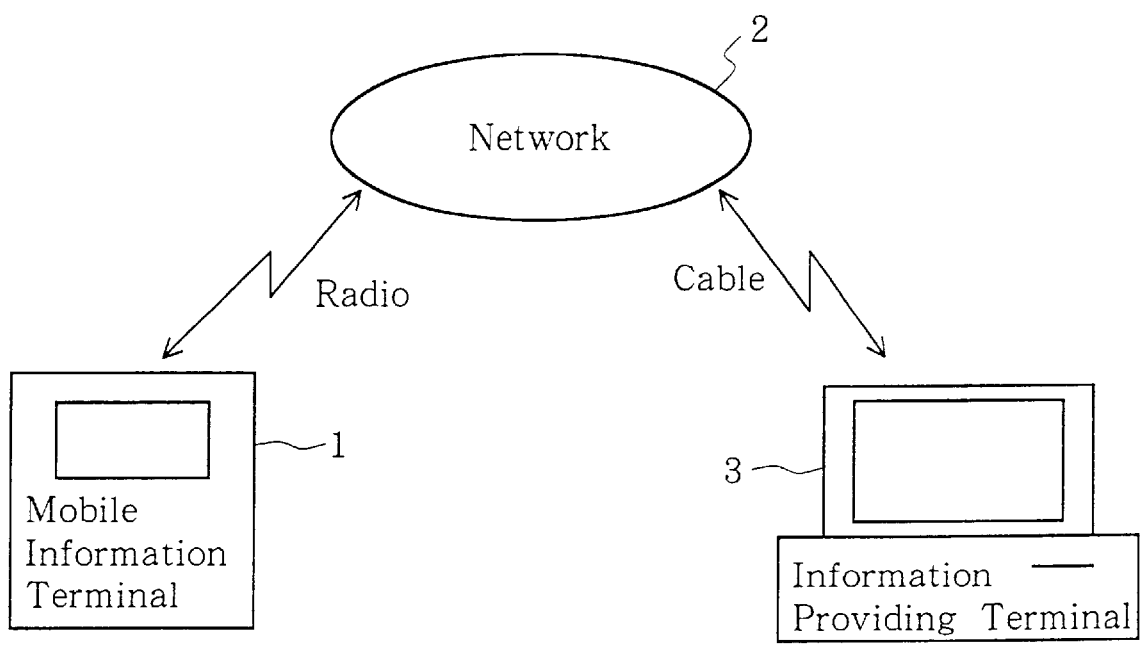
FIG. 1 is a schematic construction of an information providing system according to an embodiment of the present invention.

FIG. 1 is a schematic construction of an information providing system according to an embodiment of the present invention. In FIG. 1, the information providing system is constructed with a mobile information terminal 1 having a function of displaying an information transmitted on a screen thereof, a network 2 connected to the mobile information terminal 1 through a radio circuit and an information providing terminal 3 connected to the network 2 through a cable circuit to provide the information to the mobile information terminal 1.

The information providing terminal 3 transmits items of an information and a ciphered information body to the mobile information terminal 1 during a time in which the radio circuit is not busy. The mobile information terminal 1 displays only the items to a user and, when the user selects one of the items, which is necessary, requests the information providing terminal 3 of sending a deciphering key for the selected information.

Since the body of the information has been received by the mobile information terminal 1 when the latter requests the deciphering key, the information providing terminal 3 charges for the transmitted information to the mobile information terminal 1 by utilizing the request of the deciphering key from the mobile information terminal 1. In a case where there is a plurality of information to be provided to the mobile information terminal 1, the information providing terminal 3 produces deciphering keys by using random numbers for the respective information and ciphers them.

Figure 2:
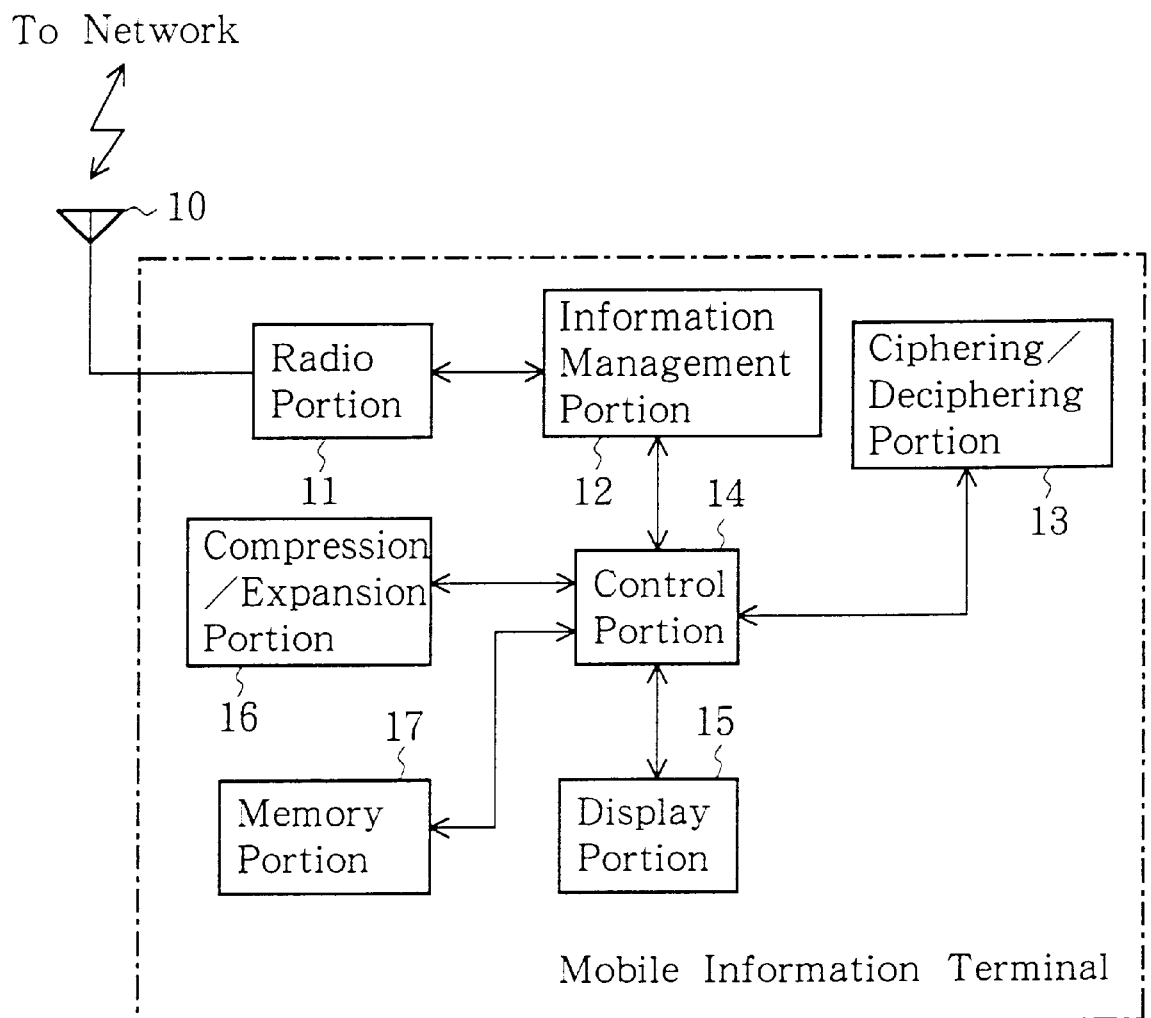
FIG. 2 is a block circuit diagram showing a construction of a mobile information terminal shown in FIG. 1.

FIG. 2 is a block circuit diagram showing a construction of the mobile information terminal 1. In FIG. 2, the mobile information terminal 1 is constructed with an antenna 10, a radio portion 11, an information management portion 12, a ciphering/deciphering portion 13, a control portion 14, a display portion 15, a compression/expansion portion 16 and a memory portion 17.

The radio portion 11 is connected to the network 2 and the information management portion 12 performs an extraction and addition of the item when the information body is ciphered, or notifies the user of the information when the information is not ciphered. The ciphering/deciphering portion 13 deciphers the ciphered information. The display portion 15 displays the information and/or data. The compression/expansion portion 16 compresses the ciphered information and the memory portion 17 stores the information compressed by the compression/expansion portion 16. The control portion 14 may comprise a ROM (read-only-memory) or an IC (integrated circuit) memory, etc., as a control memory which is not shown and controls the respective portions by executing a program stored in the control memory.

Figure 3:
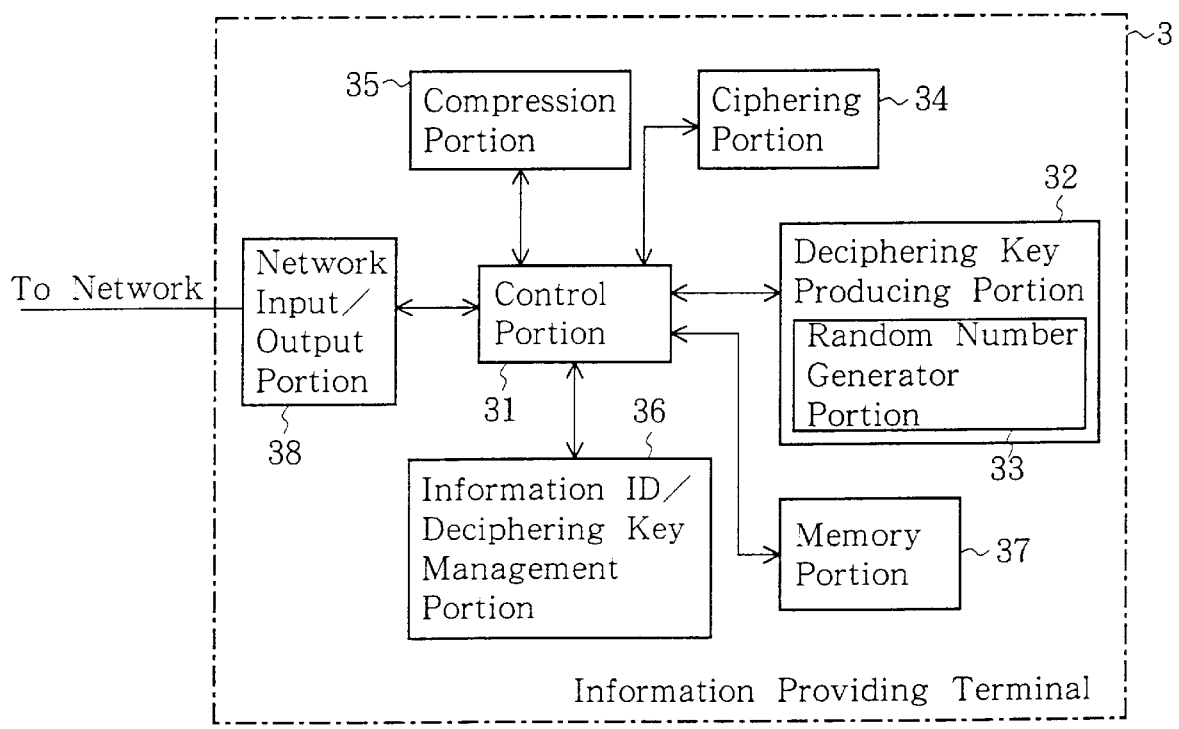
FIG. 3 is a block circuit diagram showing a construction of an information providing terminal shown in FIG. 1.

FIG. 3 is a block circuit diagram showing a construction of the information providing terminal 3 shown in FIG. 1. In FIG. 3, the information providing terminal 3 is constructed with a control portion 31, a deciphering key producing portion 32, a random number generator portion 33, a ciphering portion 34, a compression portion 35, an information ID and deciphering key management portion 36, a memory portion 37 and a network input/output portion 38.

The deciphering key producing portion 32 produces a deciphering key and the random number generator portion 33 is provided in the deciphering key producing portion 32 and generates random numbers. The ciphering portion 34 ciphers the information body on the basis of the deciphering key produced by the deciphering key producing portion 32 and the compression portion 35 compresses the notice information body to the mobile information terminal 1. The information ID and deciphering key management portion 36 manages the deciphering key produced by the deciphering key producing portion 32 and the information ID (identification number) attached to the notice information to the mobile information terminal 1. The memory portion 37 stores the body of notice information compressed by the compression portion 35, the item of the information and the information ID. The network input/output portion 38 performs an input/output operation to the network 2 through a cable circuit. The control portion 31 controls the respective portions by executing the program stored in the control memory which is not shown and may be a ROM or an IC memory, etc.

Figure 4:
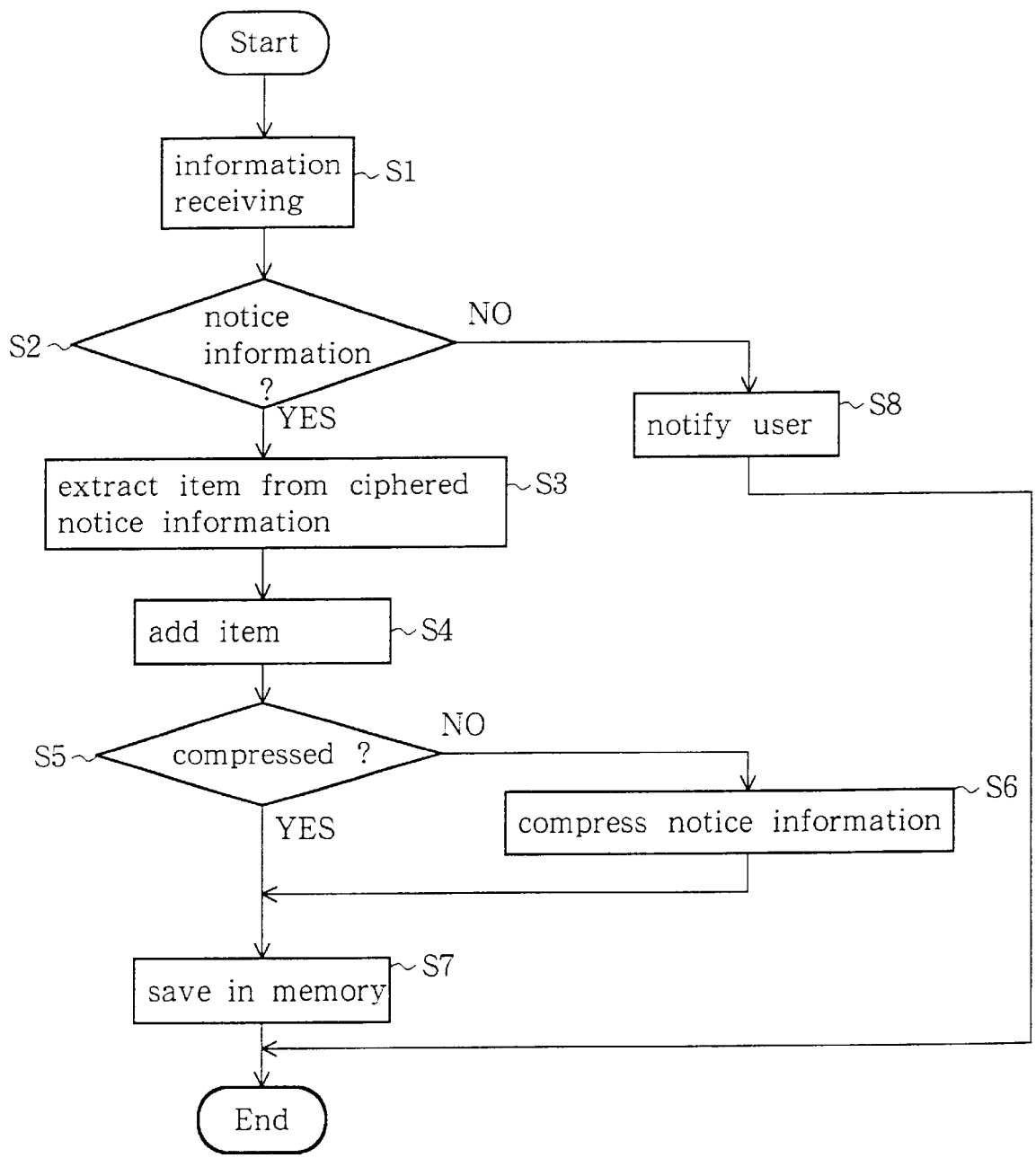
FIG. 4 is a flowchart showing a notice information receiving operation of the mobile information terminal shown in FIG. 1.

FIG. 4 is a flowchart showing an information receiving operation of the mobile information terminal 1 shown in FIG. 1. The information receiving operation of the mobile information terminal 1 with reference to FIGS. 1, 2 and 4.

When the mobile information terminal 1 receives the ciphered information at the radio portion 11 thereof (step S1, FIG. 4) and when the received information is a ciphered notice information (step S2, FIG. 4), the mobile information terminal 1 extracts the item from the ciphered notice information (step S3, FIG. 4) and adds the item (step S4, FIG. 4). In this case, since the notice information is transmitted to the mobile information terminal 1 when the radio circuit is not busy, regardless of whether or not the user needs it, the mobile information terminal 1 performs only the addition of the item of the notice information and does not notify the user of the reception of the notice information. If the notice information received by the mobile information terminal 1 is not compressed (step S5, FIG. 4), the mobile information terminal 1 stores it in the memory portion 17 after compression thereof (step S6, FIG. 4). If the information is compressed, it is stored in the memory portion 17 as it is (step S7, FIG. 4). Further, if the received information is not a notice information (step S2, FIG. 4), the mobile information terminal 1 notifies the user of the received information (step S8, FIG. 4).

Figure 5:
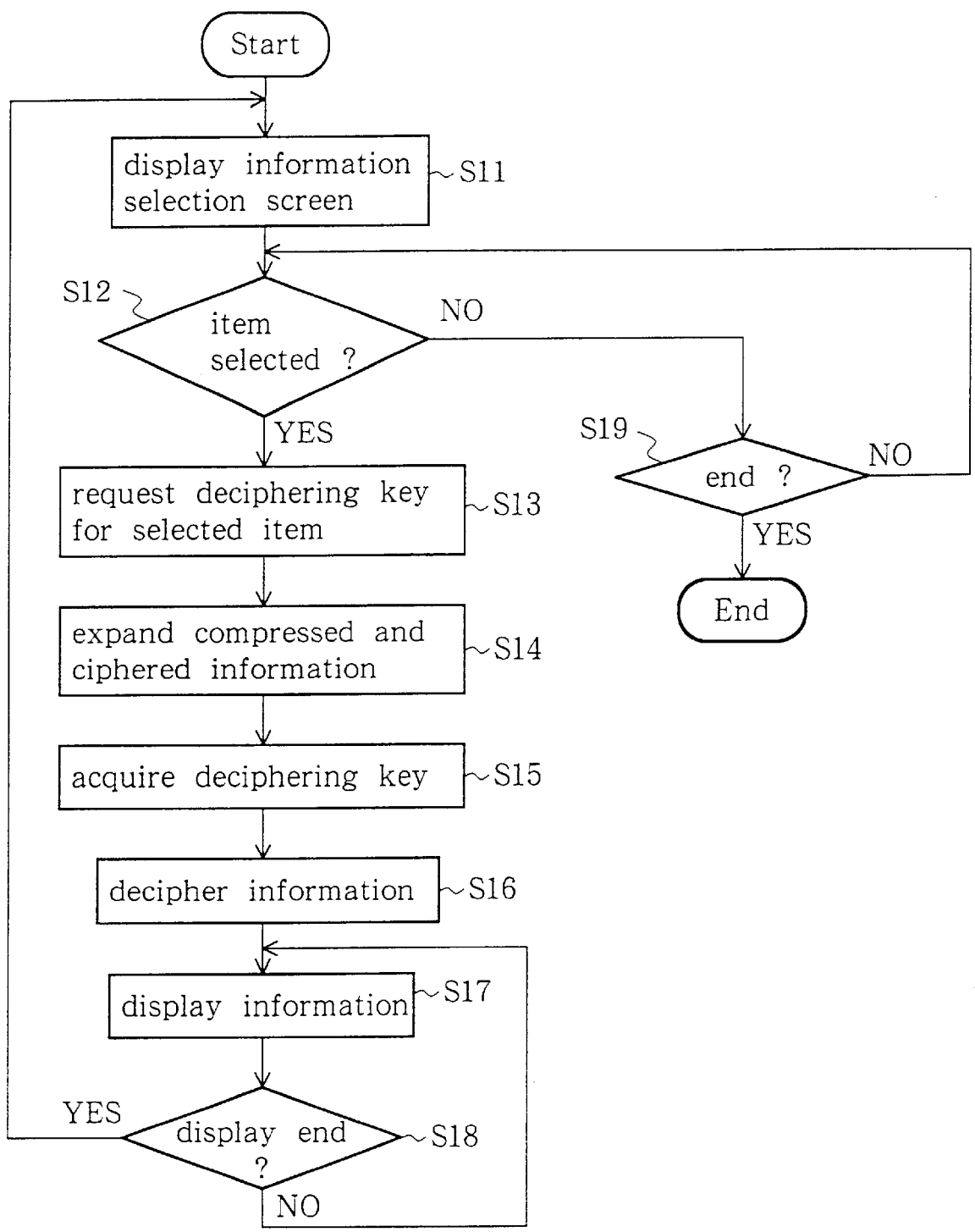
FIG. 5 is a flowchart showing a notice information display operation of the mobile information terminal shown in FIG. 1.
Figure 6:
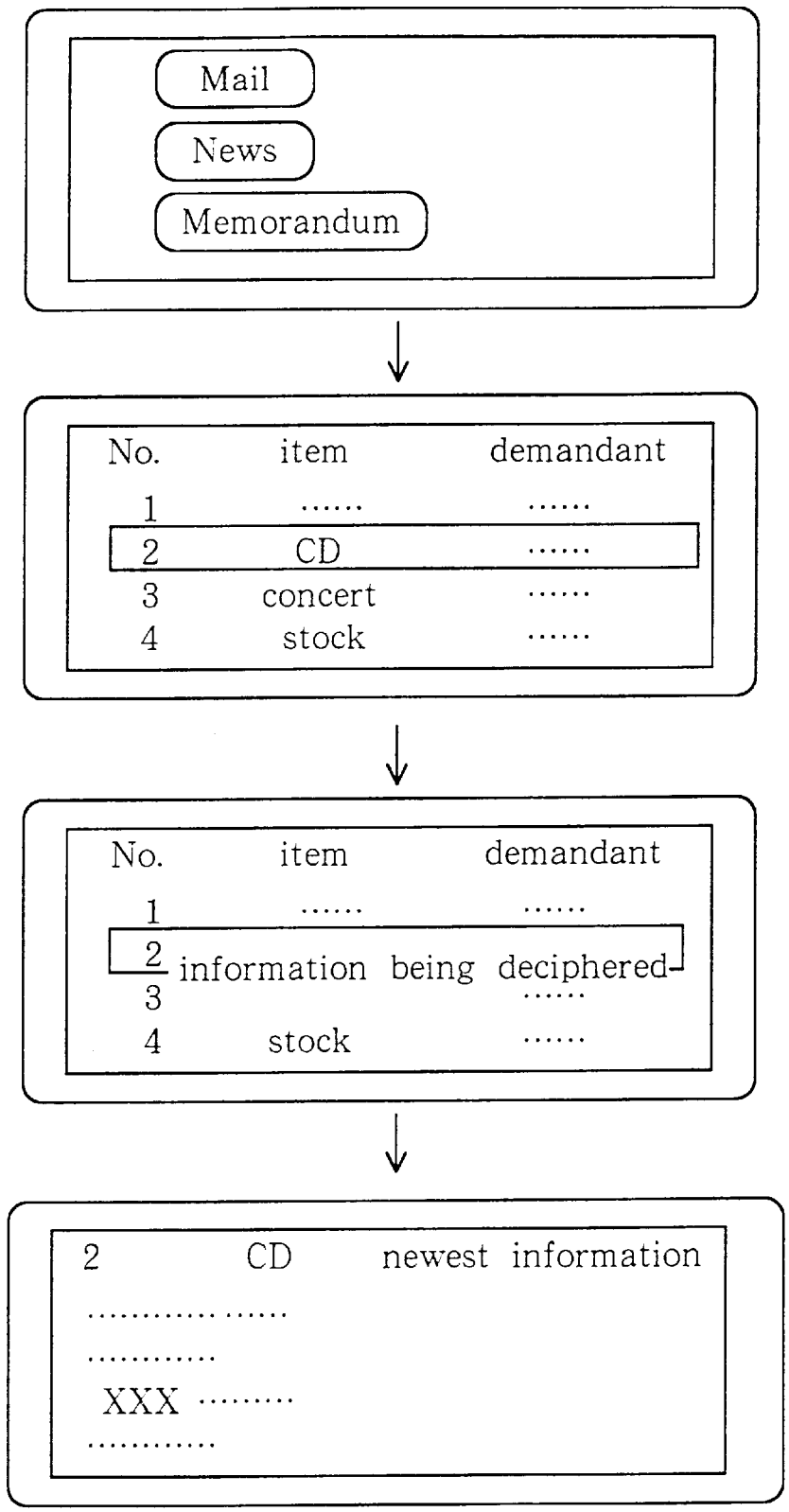
FIG. 6 shows displays of the notice information on a screen of the mobile information terminal shown in FIG. 1.

FIG. 5 is a flowchart showing a notice information displaying operation of the mobile information terminal 1 shown in FIG. 1 and FIG. 6 shows notice information displays in the mobile information terminal 1 shown in FIG. 1. The displaying operation of the mobile information terminal 1 will be described with reference to FIGS. 1, 2, 5 and 6.

When the user requires an information, the user selects its item on an information selection screen (step S11, FIG. 5). In this case, the mobile information terminal 1 displays the items by using the display portion 15 thereof. When the user sees the items and selected one of them as a required information (step S12, FIG. 5), the mobile information terminal 1 requests the information providing terminal 3 to transmit the deciphering key corresponding thereto (step S13, FIG. 5), expands the ciphered and compressed information (step S14, FIG. 5) and waits for an acquisition of the deciphering key. When the mobile information terminal 1 acquires the deciphering key from the information providing terminal 3 (step S15, FIG. 5), it deciphers the ciphered information (step S16, FIG. 5). After the deciphering, the mobile information terminal 1 displays the deciphered information (step S17, FIG. 5). The charging for the deciphered information is performed to the mobile information terminal 1 by the information providing terminal 3 at the time when the deciphering key is transmitted from the information providing terminal 3 to the mobile information terminal 1.

For example, when a ciphered information is transmitted to the mobile information terminal 1 having the function of a portable telephone set and a user of the portable telephone set selects its item on the information selection screen (see a first screen display in FIG. 6), an item screen containing numbers, items and destinations, etc., is displayed (see a second display screen in FIG. 6). Thereafter, when the user selects a certain item, the acquisition of the deciphering key and the deciphering of the information are performed and some message (for example, "information deciphering") is displayed (see a third display screen in FIG. 6). When the information deciphering is completed, the deciphered information is displayed to the user (see a fourth display screen in FIG. 6).

Figure 7:
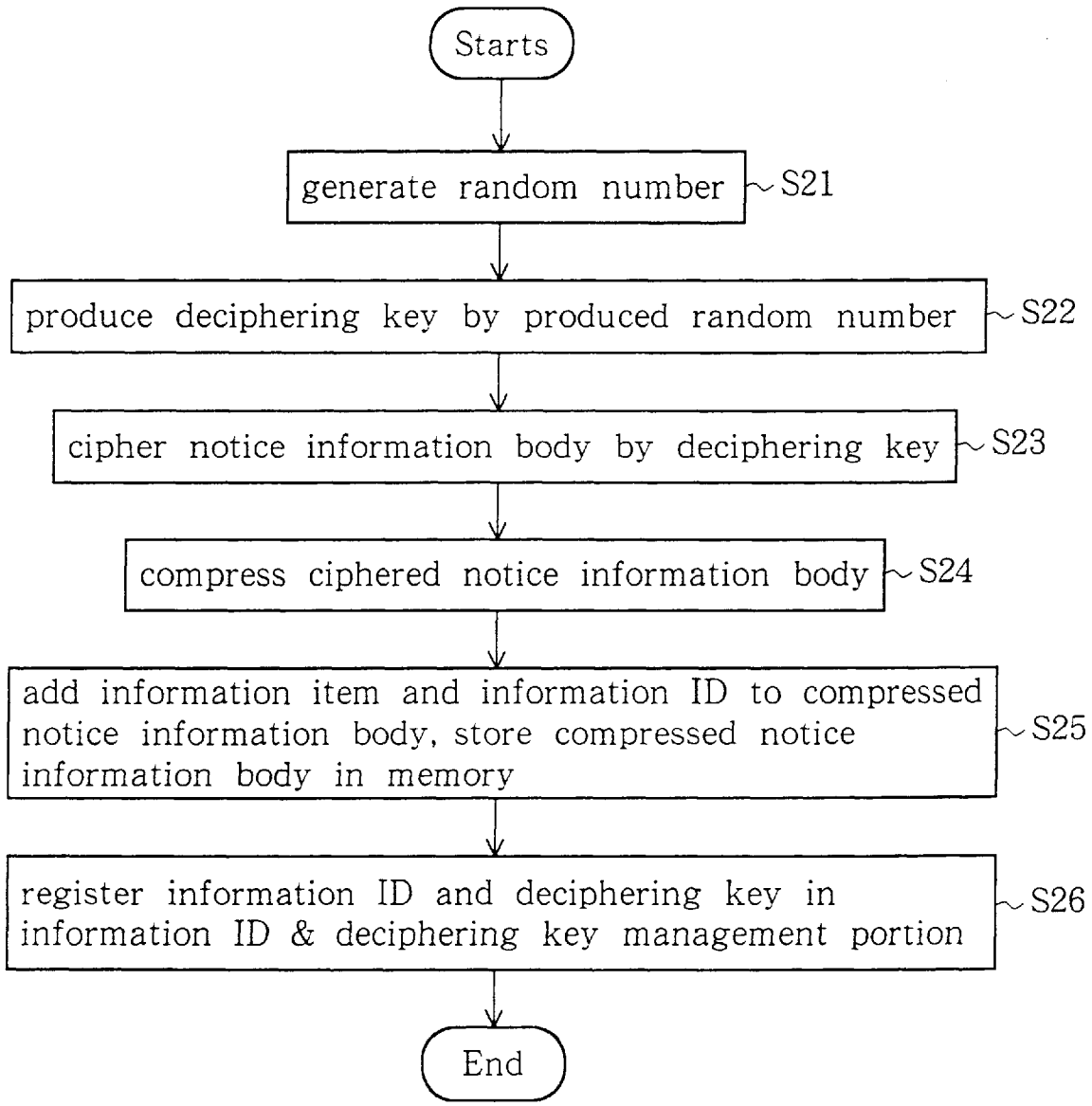
FIG. 7 is a flowchart showing a notice information producing processing in the information providing terminal shown in FIG. 1.
Figure 8:
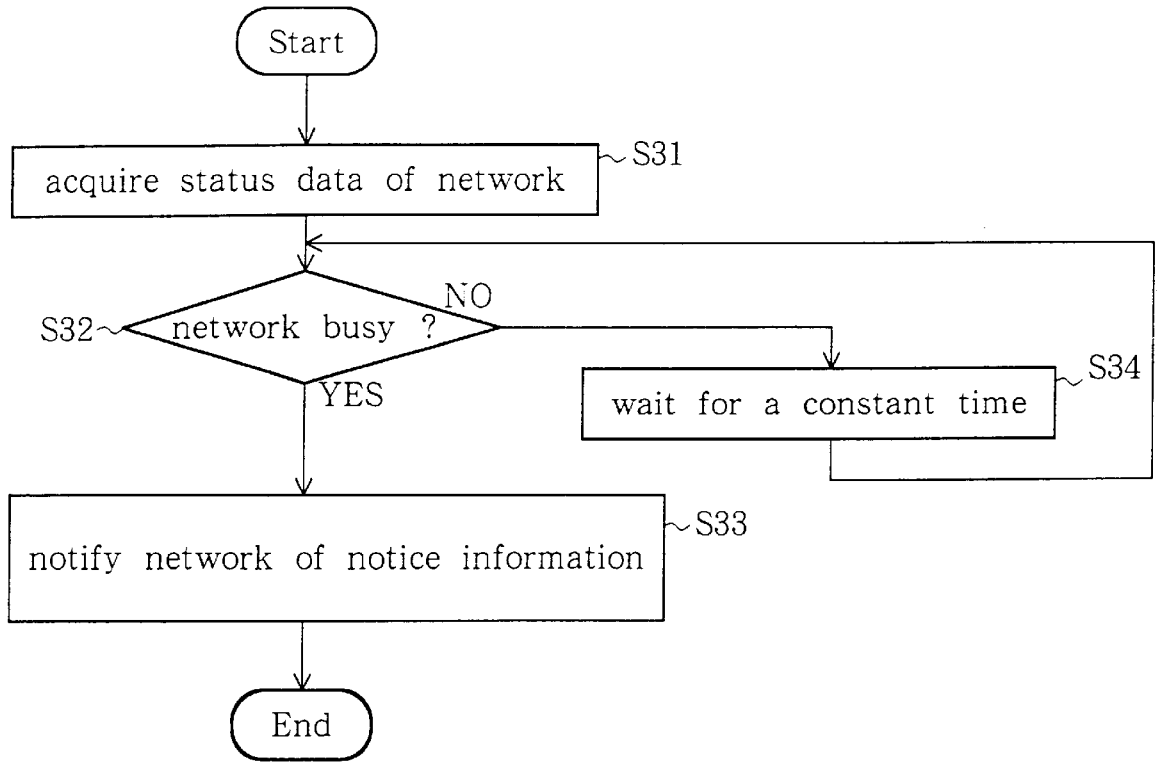
FIG. 8 is a flowchart showing a notice information transmission processing in the information providing terminal shown in FIG. 1.
Figure 9:
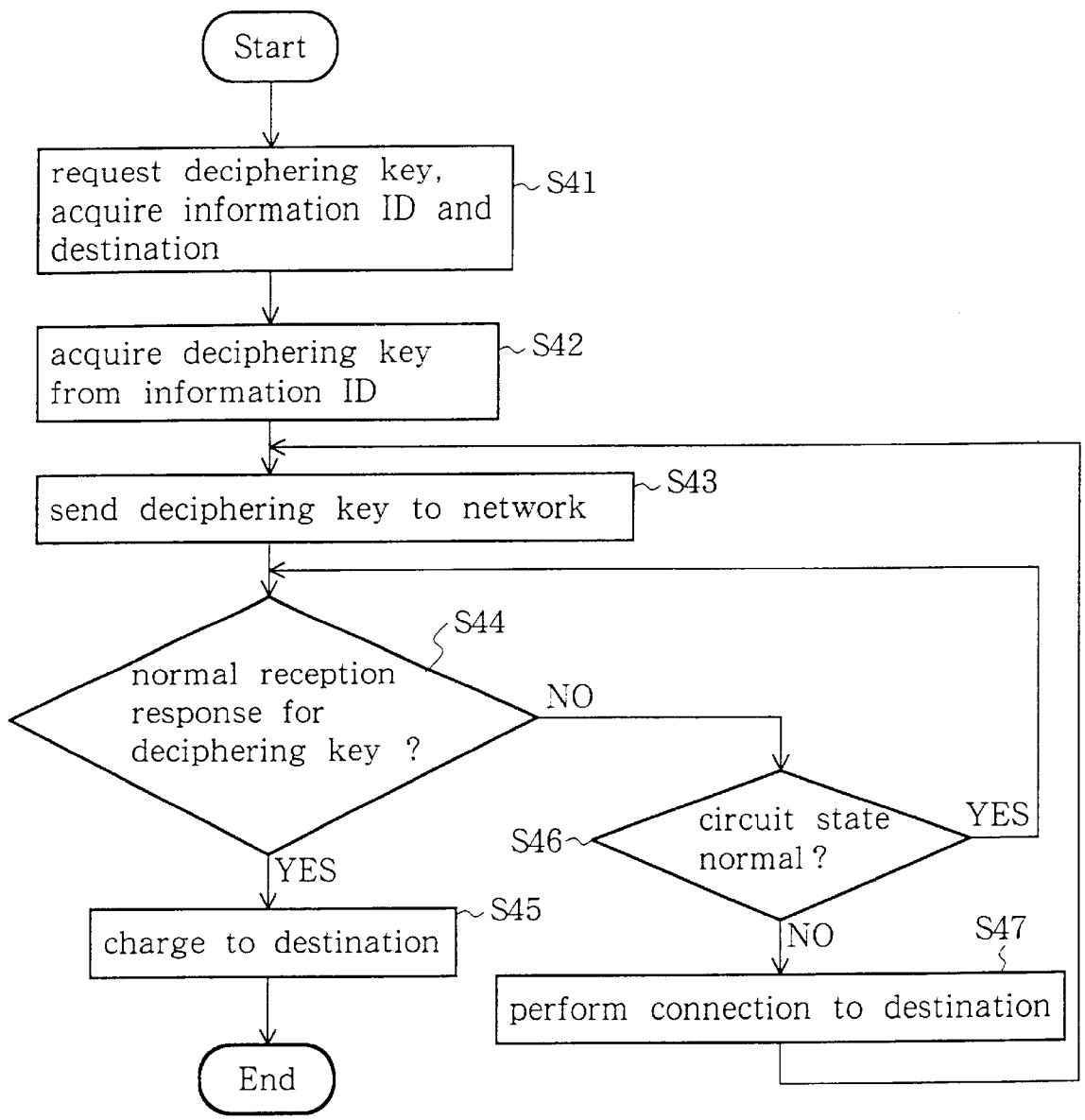
FIG. 9 is a flowchart showing a charging processing in the information providing terminal shown in FIG. 1.

FIG. 7 is a flowchart showing a notice information producing processing in the information providing terminal shown in FIG. 1, FIG. 8 is a flowchart showing a notice information transmission processing in the information providing terminal shown in FIG. 1 and FIG. 9 is a flowchart showing a charging processing in the information providing terminal shown in FIG. 1. The processing performed in the information providing terminal 3 will be described with reference to FIGS. 1, 3 and 7 to 9.

When there is a notice information to the mobile information terminal 1, the random number generator portion 33 of the information providing terminal 3 generates random numbers (step S21, FIG. 7). The deciphering key producing portion 32 produces the deciphering key on the basis of the random numbers generated by the random number generator portion 33 (step S22, FIG. 7) and the ciphering portion 34 ciphers the notice information body on the basis of the deciphering key produced by the deciphering key producing portion 32 (step S23, FIG. 7). The compression portion 35 compresses the body of notice information ciphered by the ciphering portion 34 (step S24, FIG. 7). The notice information body which is compressed by the compression portion 35 is attached with the item of information and the information ID and is stored in the memory portion 37 (step S25, FIG. 7). Simultaneously therewith, the information ID of the notice information and the deciphering key are registered in the information ID and deciphering key management portion 36 (step S26, FIG. 7).

Thereafter, in order to notify the mobile information terminal 1 of the notice information, the information providing terminal 3 acquires a status data of the network 2 through the network input/output portion 38 (step S31, FIG. 8) and determines whether or not the network 2 is busy on the basis of the status data (step S32, FIG. 8). If the network 2 is not busy, the information providing terminal 3 notifies the network 2 of the notice information stored in the memory portion 37 through the network input/output portion 38 (step S33, FIG. 8). If the network 2 is busy, the information providing terminal 3 waits for a certain constant time (step S34, FIG. 8). Then, the information providing terminal 3 acquires the status data of the network 2 through the network input/output portion 38 (step S31, FIG. 8) and determines whether or not the network 2 is busy on the basis of the thus acquired status data (step S32, FIG. 8).

In a case where the mobile information terminal 1 requests the deciphering key against the notice information notified by the information providing terminal 3, the information providing terminal 3 acquires the information ID of the notice information and the demandant (telephone number, etc.) from the mobile information terminal 1 (step S41, FIG. 9). The information providing terminal 3 acquires the deciphering key from the information ID and deciphering key management portion 36 on the basis of the information ID acquired from the mobile information terminal 1 (step S42, FIG. 9) and sends the deciphering key to the network 2 through the network input/output portion 38 (step S43, FIG. 9). Thereafter, the information providing terminal 3 determines whether or not there is a normal, deciphering key reception response from the mobile information terminal 3 (step S44, FIG. 9). If there is the normal reception response of the deciphering key from the mobile information terminal 1, the information providing terminal 3 charges for the information to the demandant (the user (owner) of the mobile information terminal) (step S45, FIG. 9).

On the contrary, if there is no normal reception response of the deciphering key from the mobile information terminal 1, the information providing terminal 3 determines whether or not the circuit status is normal (step S46, FIG. 9). If the information providing terminal 3 determines the circuit status as normal, it waits for a normal reception response of the deciphering key from the mobile information terminal 1 (steps S44 and S45, in FIG. 9). If the information providing terminal 3 determines the circuit condition as abnormal due to such as circuit break off, it performs a connection operation with respect to the demandant (mobile information terminal 1) (step S47, FIG. 9) and, after the connection to the demandant is established, re-transmits the deciphering key to the network 2 through the network input/output portion 38 (step S43, FIG. 9).

In this manner, the item and the ciphered body of information are notified to the mobile information terminal 1 from the information providing terminal 3 when the circuit between the mobile information terminal 1 and the information providing terminal 3 is not busy. Only the item is displayed in the mobile information terminal 1 to notify the user of the item. The information providing terminal 3 is requested by the mobile information terminal 1 to send the deciphering key for an information selected by the user. The mobile information terminal 1 receives the deciphering key from the information providing terminal 3. The information providing terminal 3 charges for the information transmitted to the mobile information terminal 1 at the time when the mobile information terminal 1 requests the deciphering key. Since the ciphered notice information body transmitted from the information providing terminal 3 has been received by the mobile information terminal 1 already, it is possible to reduce the waiting time from the time at which the user selects the necessary information to the time at which the user reads the information.

Further, since the information providing terminal 3 ciphers the notice information body and transmits it during a time in which the circuit between the mobile information terminal 1 and the information providing terminal 3 is not busy, it is possible to reduce the load of the network 2.

Further, the information providing terminal 3 performs the charging upon the acquisition request of the deciphering key from the mobile information terminal 1, the charging is not performed for the re-transmission during the communication of the ciphered notice information body and can be performed for the amount of pure data of the notice information.

As described hereinbefore, according to the present invention, in the information providing system in which a mobile information terminal having a function of displaying an information on a screen by utilizing a radio wave and an information providing terminal are connected to each other through a network, a notice information body to be provided from the information providing terminal to the mobile information terminal is ciphered, the ciphered notice information body and the item thereof are notified to the mobile information terminal, the mobile information terminal requests the information providing terminal to transmit a deciphering key of the notice information corresponding to the item selected when only the item of the notice information transmitted from the information providing terminal is displayed, the notice information body is deciphered on the basis of the deciphering key transmitted from the information providing terminal and displayed and the information providing terminal charges for the notice information sent to the mobile information terminal when the mobile information terminal requests the deciphering key. Therefore, it is possible to reduce the waiting time from the time at which the user selects the necessary information to the time at which the user reads the information and to reduce the load of the network and the charging can be performed for the amount of pure data of the notice information.

What is claimed is:

1. An information providing system in which a mobile information terminal having a function of displaying an information on a screen by utilizing a radio wave and an information providing terminal are connected to each other through a network, said information providing system comprising:

ciphering means provided in said information providing terminal, for ciphering a notice information body to be provided to said mobile information terminal;

notice means provided in said information providing terminal, for notifying said mobile information terminal of an item of the notice information and the notice information body ciphered by said ciphering means;

request means provided in said mobile information terminal, for requesting said information providing terminal to send a deciphering key of the notice information corresponding to the item selected when only the item of the notice information transmitted from said notice means is displayed;

deciphering means provided in said mobile information terminal, for deciphering the corresponding notice information body on the basis of the deciphering key transmitted from said information providing terminal; and charging means provided in said information providing terminal, for charging for the notice information notified to said mobile information terminal according to the request of the deciphering key from said mobile information terminal.

2. An information providing system as claimed in claim 1, wherein said notice means notifies said mobile information terminal of the item of the notice information and the notice information body ciphered by said ciphering means when said circuit connecting said information providing terminal and said mobile information terminal is not busy.

3. An information providing system as claimed in claim 1, wherein said information providing terminal includes compression means for compressed the notice information body ciphered by said ciphering means and the notice information ciphered by said ciphering means is compressed by said compression means and then notified to said mobile information terminal.

4. An information providing system as claimed in claim 3, wherein said mobile information terminal includes expansion means for expanding the notice information body compressed by said compression means before the deciphering key is transmitted from said information providing terminal.

5. A charging method of an information providing system in which a mobile information terminal having a function of displaying an information on a screen by utilizing a radio wave and an information providing terminal are connected to each other through a network, said charging method comprising the steps of:

ciphering a body of a notice information to be provided to the mobile information terminal;

notifying the mobile information terminal of an item of the notice information and the notice information body ciphered by the ciphering means;

requesting the information providing terminal to transmit a deciphering key of the notice information corresponding to the item selected when only the item of the notice information transmitted from the notice means is displayed;

deciphering the body of the corresponding notice information on the basis of the deciphering key transmitted from the information providing terminal; and charging for the notice information notified to the mobile information terminal according to the request of the deciphering key from the mobile information terminal.

6. A charging method as claimed in claim 5, wherein the step of notifying the item of the notice information and the ciphered notice information is to notify said mobile information terminal of the item of the notice information and the ciphered notice information body during the time when the circuit for connecting the information providing terminal and the mobile information terminal is not busy.

7. A charging method as claimed in claim 5, further comprising the step of compressing the ciphered notice information body in the information providing terminal, wherein the ciphered notice information body is compressed and then notified to the mobile information terminal.

8. A charging method as claimed in claim 7, further comprising the step of expanding the notice information body compressed in the mobile information terminal to expand the notice information body until the deciphering key is transmitted from the information providing terminal.

9. A recording medium recorded with a charging control program of the information providing system in which a mobile information terminal having a function of displaying an information on a screen by utilizing a radio wave and an information providing terminal are connected to each other through a network, said charging control program comprising the step of:

ciphering a notice information body to be provided to the mobile information terminal;

notifying the mobile information terminal of an item of the notice information and the ciphered notice information body;

requesting the information providing terminal to transmit a deciphering key of the notice information corresponding to the item selected when only the item of the notice information transmitted from the information providing terminal is displayed and, then, deciphering the corresponding notice information body on the basis of the deciphering key transmitted from the information providing terminal; and charging the notice information notified to the mobile information terminal according to the request of the deciphering key from the mobile information terminal.

10. A recording medium as claimed in claim 9, wherein the step of notifying the mobile information terminal of an item of the notice information and the ciphered notice information body is performed when the circuit connecting the mobile information terminal and the information providing terminal is not busy.

11. A recording medium as claimed in claim 9, wherein the ciphered information body is compressed in the information providing terminal and the compressed, ciphered information body is notified to the mobile information terminal.

12. A recording medium as claimed in claim 11, wherein the compressed, ciphered information body is expanded by the mobile information terminal until the deciphering key is transmitted from the information providing terminal.

* * * * *